(12) United States Patent
Murschall et al.

(10) Patent No.: US 6,689,454 B2
(45) Date of Patent: Feb. 10, 2004

(54) WHITE FLAME-RESISTANT UV-STABLE THERMOFORMABLE FILM MADE FROM A CRYSTALLIZABLE THERMOPLASTIC, A METHOD FOR PRODUCTION AND THE USE THEREOF

(75) Inventors: Ursula Murschall, Nierstein (DE); Guenther Crass, Taunusstein (DE); Ulrich Kern, Ingelheim (DE); Klaus Oberlaender, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 10/181,752

(22) PCT Filed: Jan. 11, 2001

(86) PCT No.: PCT/EP01/00254

§ 371 (c)(1),
(2), (4) Date: Jul. 19, 2002

(87) PCT Pub. No.: WO01/53407

PCT Pub. Date: Jul. 26, 2001

(65) Prior Publication Data

US 2003/0012937 A1 Jan. 16, 2003

(30) Foreign Application Priority Data

Jan. 20, 2000 (DE) .......... 100 02 179
Mar. 13, 2000 (DE) .......... 100 23 623

(51) Int. Cl.[7] .......... B32B 27/08; B32B 27/18; B32B 27/20; B32B 27/36; B32B 31/16
(52) U.S. Cl. .......... 428/328; 428/480; 428/910; 428/403; 428/404; 264/288.4; 264/290.2; 106/15.05; 106/18.14; 106/18.18; 106/18.31; 106/400; 106/436
(58) Field of Search .......... 428/480, 910, 428/403, 404, 323, 328; 264/288.4, 290.2; 106/15.05, 18.14, 18.18, 18.31, 400, 436

(56) References Cited

U.S. PATENT DOCUMENTS

| | | | | |
|---|---|---|---|---|
| 3,322,716 A | * | 5/1967 | Klein et al. | 524/135 |
| 3,947,423 A | * | 3/1976 | Hills | 524/118 |
| 4,102,853 A | * | 7/1978 | Kawamura et al. | 524/425 |
| 4,295,886 A | * | 10/1981 | Gresham | 106/18.19 |
| 4,440,924 A | * | 4/1984 | Kuze et al. | 528/275 |
| 4,454,312 A | * | 6/1984 | Kuze et al. | 528/275 |
| 5,173,357 A | * | 12/1992 | Nakane et al. | 428/220 |
| 5,248,713 A | * | 9/1993 | Lunk et al. | 524/120 |
| 5,674,947 A | * | 10/1997 | Oishi et al. | 525/289 |
| 5,972,445 A | * | 10/1999 | Kimura et al. | 428/35.4 |
| 6,270,888 B1 | * | 8/2001 | Rutter et al. | 428/347 |
| 6,521,351 B2 | * | 2/2003 | Murschall et al. | 428/480 |
| 6,534,169 B2 | * | 3/2003 | Pfeiffer et al. | 428/336 |
| 2002/0136875 A1 | * | 9/2002 | Murschall et al. | 428/212 |
| 2002/0136879 A1 | * | 9/2002 | Murschall et al. | 428/220 |
| 2002/0136880 A1 | * | 9/2002 | Murschall et al. | 428/220 |
| 2002/0176978 A1 | * | 11/2002 | Murschall et al. | 428/220 |
| 2002/0187328 A1 | * | 12/2002 | Murschall et al. | 428/220 |
| 2003/0017317 A1 | * | 1/2003 | Murschall et al. | 428/220 |
| 2003/0032714 A1 | * | 2/2003 | Kawasaki | 524/554 |
| 2003/0055136 A1 | * | 3/2003 | Murschall et al. | 524/100 |

FOREIGN PATENT DOCUMENTS

| | | |
|---|---|---|
| DE | 23 46 787 A1 | 3/1975 |
| EP | 0 044 515 A1 | 1/1982 |
| EP | 0 078 633 A1 | 5/1983 |
| EP | 0 620 245 A1 | 10/1994 |
| EP | 0 942 031 A1 | 9/1999 |
| EP | 0 945 261 A2 * | 9/1999 |
| EP | 1 052 269 A1 | 5/2000 |
| EP | 1 038 905 A2 | 9/2000 |
| GB | 2 344 596 A | 6/2000 |
| WO | WO 98/06575 A1 | 2/1998 |

OTHER PUBLICATIONS

Schimtz, Peter et al., "Films." Ullmann's Encyclopedia of Industrial Chemistry, 5th Ed., vol. A11 (1988), pp. 85–95, 108–110.*
H. Day, D. M. Wiles, Journal Applied Polymer Science, vol. 16, pp. 203–215, (1972).

* cited by examiner

Primary Examiner—Vivian Chen
(74) Attorney, Agent, or Firm—ProPat, L.L.C.

(57) ABSTRACT

The invention relates to a white, flame-resistant, UV-stable, thermoformable, oriented film made from a crystallizable thermoplastic, the thickness of which lies in the range of from 10 μm to 350 μm. Said film comprises at least one white pigment, a flame-proofing agent and a UV absorber and is characterized by good stretchability and thermoformability, by good optical and mechanical properties and an economical production. The invention further relates to a method for the production of said film and the use thereof.

20 Claims, No Drawings

WHITE FLAME-RESISTANT UV-STABLE THERMOFORMABLE FILM MADE FROM A CRYSTALLIZABLE THERMOPLASTIC, A METHOD FOR PRODUCTION AND THE USE THEREOF

The invention relates to a white, flame-retardant, UV-resistant, thermoformable, oriented film made from a crystallizable thermoplastic, the thickness of the film being in the range from 10 to 350 µm. The film comprises at least one white pigment and one flame retardant and one UV absorber and has good orientability and thermoformability, and very good optical and mechanical properties, and can be produced cost-effectively. The invention further relates to the use of this film and to a process for its production.

BACKGROUND OF THE INVENTION

White, oriented films made from crystallizable thermoplastics with a thickness of from 10 to 350 µm are well known.

These films do not comprise UV absorbers of any kind as light stabilizers and do not comprise flame retardants of any kind, and therefore neither the films nor the items produced from them are suitable for outdoor applications which demand fire protection or flame retardancy. The films do not pass the fire tests to DIN 4102 Part 2 and Part 1, or the UL 94 test. The films have inadequate thermoformability.

Even after a short time in outdoor applications, these films yellow and exhibit impairment of mechanical properties due to photooxidative degradation by sunlight.

EP-A-0 620 245 describes films with improved heat resistance. These films comprise antioxidants which are suitable for scavenging free radicals formed in the film and degrading any peroxide formed. However, that specification gives no proposal as to how the UV resistance of these films might be improved.

DE-A 2346 787 describes a flame-retardant polymer. Alongside the polymer, the use of the polymer is also claimed for producing films or fibers.

The following shortcomings were apparent during production of films from this phospholane-modified polymer:

The polymer is very susceptible to hydrolysis and has to be very thoroughly predried. The polymer cakes during its drying by prior-art dryers, and it is impossible to produce a film except under the most difficult of conditions.

The films produced under extreme and uneconomic conditions embrittle on exposure to heat, i.e. the mechanical properties are severely impaired due to substantial embrittlement, making the film unusable. This embrittlement occurs after as little as 48 hours of exposure to heat.

It was an object of the present invention to provide a white, flame-retardant, UV-resistant, thermoformable, oriented film with a thickness of from 10–350 µm which not only can be produced cost-effectively and has good orientability and good mechanical and optical properties, but in particular is flame retardant, does not embrittle on exposure to heat, is thermoformable, and has high UV resistance.

Flame retardancy means that in a fire test the white film complies with the conditions of DIN 4102 Part 2 and in particular the conditions of DIN 4102 Part 1, and can be allocated to construction materials class B 2 and in particular B1 for low-flammability materials.

The film is also intended to pass the UL 94 test "Vertical Burning Test for Flammability of Plastic Material", permitting its classification in class 94 VTM-0. This means that 10 seconds after removal of the Bunsen burner the film has ceased to burn, and after 30 seconds no glowing is observed, and no drips are found to occur.

High UV resistance means that sunlight or other UV radiation causes no, or only extremely little, damage to the films, so that the films are suitable for outdoor applications and/or critical indoor applications. In particular, after a number of years in outdoor applications the films are intended not to yellow, nor to exhibit any embrittlement or surface cracking, nor to exhibit any impairment of mechanical properties. High UV resistance therefore means that the film absorbs UV light and does not transmit light until the visible region has been reached.

Thermoformability means that the film can be thermoformed to give complex and large-surface-area moldings on commercially available thermoforming machinery, without uneconomic predrying.

Examples of good optical properties include uniform coloration, high surface gloss (>15), low light transmission (<70%), and also a Yellowness Index unchanged from that of the flame-retardant and UV-modified film.

Good mechanical properties include high modulus of elasticity ($E_{MD}$>3200 N/mm$^2$: $E_{TD}$>3500 N/mm$^2$), and also good values for tensile stress at break (in MD >100 N/mm$^2$; in TD >130 N/mm$^2$).

Good orientability includes the capability of the film to give excellent orientation, both in a longitudinal direction and I transverse direction during its production, without break-offs.

Cost-effective production includes the capability of the raw materials or raw material components needed to produce the flame-retardant film to be dried using industrial-standard dryers. It is important that the raw materials neither cake nor become thermally degraded. These prior-art industrial dryers include vacuum dryers, fluidized-bed dryers, fixed-bed dryers (tower dryers). These dryers operate at temperatures of from 100 to 170° C., at which the flame-retardent polymers cake and have to be dug out, making film production impossible.

In the case of the vacuum dryer, which provides the mildest drying conditions, the raw material traverses a temperature range from about 30 to 130° C., under a vacuum of 50 mbar. Post-drying is then needed in a hopper at temperatures from 100 to 130° C. with a residence time of from 3 to 6 hours. Here, too, this polymer cakes to an extreme extent.

BRIEF DESCRIPTION OF THE INVENTION

This object is achieved by means of a white thermoformable film with a thickness in the range from 10 to 350 µm, which comprises a crystallizable thermoplastic principal constituent, and comprises at least one white pigment, at least one UV absorber, and at least one flame retardant, where expediently the UV absorber and according to invention the flame retardant are fed directly as masterbatch during the production of the film.

DETAILED DESCRIPTION OF THE INVENTION

The white, flame-retardant, UV-resistant, thermoformable, oriented film comprises, as principal constituent, a crystallizable thermoplastic. Examples of suitable crystallizable or semicrystalline thermoplastics are polyethylene terephthalate, polybutylene terephthalate, polyethylene naphthalate, preferably polyethylene terephthalate.

According to the invention, crystallizable thermoplastics are crystallizable homopolymers, crystallizable copolymers, crystallizable compounded materials (mixtures), crystallizable recycled material, and other types of crystallizable thermoplastics.

The white film may be either a single-layer or a multilayer film. The film may also have a coating of various copolyesters or adhesion promoters.

According to the invention, the white film comprises a UV absorber and a flame retardant. The UV absorber is expediently fed directly during the production of the film by way of masterbatch technology, the concentration of the UV stabilizer preferably being from 0.01 to 5% by weight, based on the weight of the layer of the crystallizable thermoplastic.

No embrittlement on brief exposure to heat means that after 100 hours of a heat-conditioning procedure at 100° C. in a circulating-air oven the film or the molding exhibits no embrittlement nor any poor mechanical properties.

The film of the invention comprises at least one flame retardant, fed directly during the production of the film by way of masterbatch technology, the concentration of the flame retardant being in the range from 0.5 to 30.0% by weight, preferably from 1.0 to 20.0% by weight, based on the weight of the layer of the crystallizable thermoplastic. The ratio of flame retardant to thermoplastic maintained during production of the masterbatch is generally in the range from 60:40% by weight to 10:90% by weight.

Typical flame retardants include bromine compounds, chloroparaffins, and 10 other chlorine compounds, antimony trioxide, aluminum trihydrates, the halogen compounds being disadvantageous due to the halogen-containing by-products produced. Another extreme disadvantage is the low lightfastness of a film modified therewith, alongside the evolution of hydrogen halides in the event of a fire.

Examples of suitable flame retardants used according to the invention are organophosphorus compounds, such as carboxyphosphinic acids, anhydrides of these, and dimethyl methylphosphonate. It is important for the invention that the organophosphorus compound is soluble in the thermoplastic, since otherwise the optical properties required are not complied with.

Since the flame retardants generally have some susceptibility to hydrolysis, it can be advisable to add a hydrolysis stabilizer.

Hydrolysis stabilizers used are generally phenolic stabilizers, alkali metal/alkaline earth metal stearates, and/or alkali metal/alkaline earth metal carbonates, in amounts of from 0.01 to 1.0% by weight. It is preferable to use amounts of from 0.05 to 0.6% by weight, in particular from 0.15 to 0.3% by weight, of phenolic stabilizers having a molar mass above 500 g/mol. Particularly advantageous compounds are pentaerythrityl tetrakis-3-(3,5-di-tert-butyl-4-hydroxphenyl) propionate or 1,3,5-trimethyl-2,4,6-tris(3,5-di-tert-butyl-4-hydroxybenzyl)benzene.

The white pigment is preferably fed by way of masterbatch technology, but may also be incorporated directly at the premises of the polymer producer. The concentration of the white pigment is from 0.2 to 40% by weight, preferably from 0.5 to 25% by weight, based on the weight of the crystallizable thermoplastic.

Preferred suitable white pigments are titanium dioxide, barium sulfate, calcium carbonate, kaolin, silicon dioxide, preferably titanium dioxide and barium sulfate.

The titanium dioxide particles may be composed of anatase or rutile, preferably predominantly of rutile, which has higher opacifying power than anatase.

In a preferred embodiment, the titanium dioxide particles are composed of at least 95% by weight of rutile. They may be prepared by a conventional process, e.g.: by the chloride process or the sulfate process. The amount of these in the base layer is from 0.3 to 25% by weight, based on the base layer, and the average particle size is relatively small, preferably in the range from 0.10 to 0.30 $\mu$m.

Titanium dioxide of the type described does not produce any vacuols within the polymer matrix during the production of the film.

The titanium dioxide particles may have the type of covering usually used as a covering for $TiO_2$ white pigment in papers or paints to improve lightfastness, made from inorganic oxides.

$TiO_2$ is known to be photoactive. On exposure to UV radiation, free radicals form on the surface of the particles. These free radicals can migrate into the film-forming polymers, causing degradation reactions and yellowing.

Particularly suitable oxides include the oxides of aluminum, silicon, zinc, or magnesium, and mixtures made from two or more of these compounds. $TiO_2$ particles with a covering made from two or more of these compounds are described by way of example in EP-A-0 044 515 and EP-A-0 078 633. The coating may also comprise organic compounds having polar and non-polar groups. The organic compounds have to have adequate thermal stability during production of the film by extrusion of the polymer melt. Examples of polar groups are —OH, —OR, —COOX (X=R, H, or Na, R=alkyl having from 1 to 34 carbon atoms). Preferred organic compounds are alkanols and fatty acids having from 8 to 30 carbon atoms in the alkyl group, in particular fatty acids and primary n-alkanols having from 12 to 24 carbon atoms, and also polydiorganosiloxanes and/or polyorganohydrosiloxanes, e.g. polydimethylsiloxane and polymethylhydrosiloxane.

The coating for the titanium dioxide particles is usually composed of from 1 to 12 g, in particular from 2 to 6 g, of inorganic oxides, and from 0.5 to 3 g, in particular from 0.7 to 1.5 g, of organic compounds, based on 100 g of titanium dioxide particles. The covering is applied to the particles in aqueous suspension. The inorganic oxides may be precipitated from water-soluble compounds, e.g. alkali metal nitrate, in particular sodium nitrate, sodium silicate (waterglass), or silica, in the aqueous suspension.

For the purposes of the present invention, inorganic oxides, such as $Al_2O_3$ or $SiO_2$, also include the hydroxides and their various stages of dehydration, e.g. oxide hydrate, the precise composition and structure of which is not known. The oxide hydrates, e.g. of aluminum and/or of silicon, are precipitated onto the calcined and ground $TiO_2$ pigment, in aqueous suspension, and the pigments are then washed and dried. This precipitation may therefore take place directly in a suspension such as that produced within the production process after calcination followed by wet-grinding. The oxides and/or oxide hydrates of the respective metals are precipitated from the water-soluble metal salts within the known pH range: for example, for aluminum use is made of aluminum sulfate in aqueous solution (pH below 4), and the oxide hydrate is precipitated within the pH range from 5 to 9, preferably from 7 to 8.5, by addition of aqueous ammonia solution or sodium hydroxide solution. If the starting material is waterglass solution or alkali metal aluminate solution, the pH of the initial charge of $TiO_2$ suspension should be within the strongly alkaline range (pH above 8). The precipitation then takes place within the pH range from 5 to 8, by addition of mineral acid, such as sulfuric acid. Once the metal oxides have been precipitated, the stirring of the suspension continues for from 15 min to about 2 h, aging the precipitated layers. The coated product is separated off from the aqueous dispersion, washed, and dried at an elevated temperature, in particular at from 70 to 100° C.

Light, in particular the ultraviolet content of solar radiation, i.e. the wavelength region from 280 to 400 nm, induces degradation in thermoplastics, as a result of which their appearance changes due to color change or yellowing, and there is also an adverse effect on mechanical/physical properties.

Inhibition of this photooxidative degradation is of considerable industrial and economic importance, since otherwise there are drastic limitations on the applications of many thermoplastics.

Absorption of UV light by polyethylene terephthalates, for example, starts at below 360 nm, increases markedly below 320 nm, and is very pronounced at below 300 nm. Maximum absorption occurs at from 280 to 300 nm.

In the presence of oxygen it is mainly chain cleavage which occurs, without any crosslinking. The predominant photooxidation products in quantity terms are carbon monoxide, carbon dioxide, and carboxylic acids. Besides the direct photolysis of the ester groups, consideration has to be given to oxidation reactions which likewise form carbon dioxide, via peroxide radicals.

In the photooxidation of polyethylene terephthalates there can also be cleavage of hydrogen at the position $\alpha$ to the ester groups, giving hydroperoxides and decomposition products of these, and this may be accompanied by chain cleavage (H. Day, D. M. Wiles: J. Appl. Polym. Sci 16, 1972, p. 203).

UV stabilizers, i.e. light stabilizers which are UV absorbers, are chemical compounds which can intervene in the physical and chemical processes of light-induced degradation. Carbon black and other pigments can give some protection from light. However, these substances are unsuitable for transparent films, since they cause discoloration or color change. The only compounds suitable for transparent matt films are organic and organometallic compounds which produce no, or only extremely slight, color or color change in the thermoplastic to be stabilized, i.e. those which are soluble in the thermoplastic.

For the purposes of the present invention, UV stabilizers suitable as light stabilizers are those which absorb at least 70%, preferably 80%, particularly preferably 90%, of the UV light in the wavelength region from 180 to 380 nm, preferably 280 to 350 nm. These are particularly suitable if they are thermally stable in the temperature range from 260 to 300° C., i.e. neither decompose nor give rise to release of gases. Examples of UV stabilizers suitable as light stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, and sterically hindered amines and triazines, preference being given to the 2-hydroxybenzotriazoles and the triazines.

The UV stabilizer(s) are preferably present in the outer layer(s). The core layer may also have UV stabilizer, if required.

It was highly surprising that the use of the abovementioned UV stabilizers in films gave the desired result. The skilled worker would probably first have attempted to achieve a certain degree of UV resistance by way of an antioxidant, but would have found that the film rapidly yellows on weathering.

In the knowledge that UV stabilizers absorb UV light and therefore provide protection, the skilled worker would be likely to have used commercially available stabilizers. He would then have observed that the UV stabilizer has unsatisfactory thermal stability, and at temperatures of from 200 to 240° C. decomposes and gives rise to release of gases, and large amounts (from about 10 to 15% by weight) of the UV stabilizer have to be incorporated in order to absorb the UV light and thus prevent damage to the film.

At these high concentrations it would have been observed that the film is yellow even just after it has been produced, with Yellowness Indices (YI) of around 25. It would also have been observed that the mechanical properties of the film have been adversely affected. Orientation would have produced exceptional problems, such as break-offs due to unsatisfactory strength, i.e. excessively low modulus of elasticity;

die deposits, causing profile variations;

roller deposits from the UV stabilizer, causing impairment of optical properties (defective adhesion, non-uniform surface);

deposits in stretching frames or heat-setting frames, dropping onto the film.

It was therefore more than surprising that even low concentrations of the UV stabilizer achieve excellent UV protection. It was very surprising that, together with this excellent UV protection, within the accuracy of measurement, the Yellowness Index of the film is unchanged from that of an unstabilized film;

there are no releases of gases, no die deposits, and no frame condensation, and the film therefore has excellent optical properties and excellent profile and layflat, and the UV-resistant film has excellent stretchability, and can therefore be produced in a reliable and stable manner on high-speed film lines at speeds of up to 420 m/min.

It was more than surprising that the use of masterbatch technology and of appropriate predrying and/or precrystallization and, where appropriate, use of small amounts of a hydrolysis stabilizer permit the production of a flame-retardant and thermoformable film with the property profile demanded in a cost-effective manner and without caking in the dryer, and that the film does not embrittle on exposure to heat and does not fracture when creased. It was very surprising that together with this excellent result and the required flame retardancy, and the thermoformability and high UV resistance within the accuracy of measurement, the Yellowness Index of the film is not adversely affected when compared with that of an unstabilized film;

there are no releases of gases, no die deposits, and no frame condensation, and the film therefore has excellent optical properties and excellent profile and layflat, and the flame-retardant UV-resistant film has excellent stretchability, and can therefore be produced in a reliable and stable manner on high-speed film lines at speeds of up to 420 m/min.

With this, the film is also cost-effective.

It was also surprising that a higher diethylene glycol content and/or polyethylene glycol content and/or IPA content than that of standard thermoplastics permits cost-effective thermoforming of the films on commercially available thermoforming plants, and gives the films capability for excellent reproduction of detail.

It is moreover very surprising that it is also possible to reuse the regrind produced from the films or from the moldings without adversely affecting the Yellowness Index of the film.

In one preferred embodiment, the white, flame-retardant film of the invention comprises, as principal constituent, a crystallizable polyethylene terephthalate having a diethylene glycol content of ≧1.0% by weight, preferably ≧1.2% by weight, in particular ≧1.3% by weight, and/or a polyethylene glycol content (PEG content) of ≧1.0% by weight, preferably ≧1.2% by weight, in particular ≧1.3% by weight, from 1 to 20% by weight of an organic phosphorus compound (dimethyl methylphosphonate) as flame retardant soluble in the polyethylene terephthalate, from 0.01 to 5.0% by weight of a UV absorber selected from the group of the 2-hydroxybenzotriazoles or the triazines and soluble in the PET, and from 0.5 to 25% by weight of titanium dioxide whose preferred particle diameter is from 0.10 to 0.50 μm, preferably a rutile-type titanium dioxide. Instead of titanium dioxide, it is also possible to use barium sulfate whose particle diameter is from 0.20 to 1.20 μm as white pigment, the concentration being from 1.0 to 25% by weight. In one preferred embodiment, it is also possible to use a mixture of these white pigments, or a mixture of one of these white pigments with another white pigment.

In one particularly preferred embodiment, the film of the invention comprises from 0.01 to 5.0% by weight of 2-(4, 6-diphenyl-1,3,5-triazin-2-yl)-5-(hexyl) oxyphenol of the formula

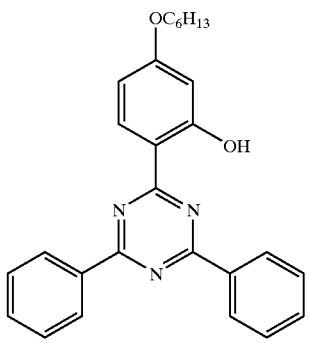

or from 0.01 to 5.0% by weight of 2,2'-methylenebis(6-(2H-benzotriazol-2-yl)-4-(1,1,3,3-tetramethyl-butyl)phenol of the formula

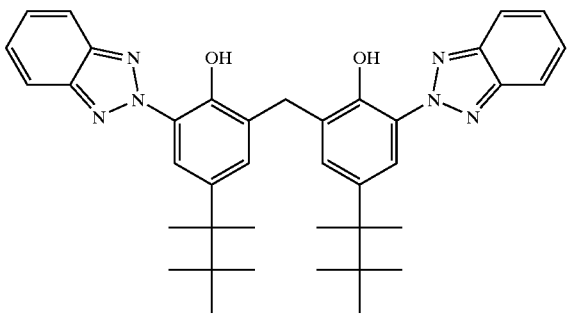

In one preferred embodiment, it is also possible to use a mixture of these two UV stabilizers, or a mixture of at least one of these two UV stabilizers with other UV stabilizers, the total concentration of light stabilizer preferably being from 0.01 to 5.0% by weight, based on the weight of crystallizable polyethylene terephthalate.

In the invention it is important for thermoformability that the crystallizable thermoplastic has a diethylene glycol content (DEG content) of ≧1.0% by weight, preferably ≧1.2% by weight, in particular ≧1.3% by weight, and/or a polyethylene glycol content (PEG content) of ≧1.0% by weight, preferably ≧1.2% by weight, in particular ≧1.3% by weight, and/or an isophthalic acid content (IPA) of from 3 to 10% by weight.

The white, UV-resistant, thermoformable, flame-retardant film has the following property profile:
  surface gloss, measured to DIN 67530 (measurement angle 20°), is greater than 15, preferably greater than 20, and light transmittance L, measured to ASTM D 1003, is less than 70%, preferably less than 60%, measured to ASTM S 1003, this being surprisingly good for the UV resistance achieved in combination with the flame retardancy.

Standard viscosity SV (DCA) of the polyethylene terephthalate, measured in dichloroacetic acid to DIN 53728 is from 600 to 1000, preferably from 700 to 900.

The white polyethylene terephthalate film which comprises at least one organic white pigment, one UV stabilizer, and one flame retardant may be either a single-layer film or a multilayer film.

In the multilayer embodiment, the film is built up from at least one corner layer and from at least one outer layer, preference being given in particular to a three-layer A-B-A or A-B-C structure.

For this embodiment it is important that standard viscosity and DEG content and/or PEG content of the polyethylene terephthalate of the core layer are similar to those of the polyethylene terephthalate of the outer layer(s) adjacent to the core layer.

In a particular embodiment, the outer layers may also be composed of a polyethylene naphthalate homopolymer or of a polyethylene terephthalate-polyethylene naphthalate copolymer, or of a compounded material.

Again in this embodiment, standard viscosity and DEG content and/or PEG content of the thermoplastics of the outer layers are similar to those of the polyethylene terephthalate of the core layer.

In the multilayer embodiment, the UV absorber is preferably present in the outer layers. If required, UV absorber may also have been provided in the core layer.

In the multilayer embodiment, the white pigment and the flame retardant are preferably present in the core layer. However, if required, white pigment and/or flame retardant may also have been provided in the outer layers.

In another embodiment it is also possible for white pigment, flame retardant and UV absorber to be present in the outer layers. If required and if fire protection requirements are stringent, the core layer may also have what is known as a "base level" of flame retardant.

Unlike in the single-layer embodiment, the concentration of the white pigment here, and of the flame retardant and of the UV stabilizer, is based on the weight in the modified layer. Highly surprisingly, weathering tests to the ISO 4892 test specification using the Atlas C165 Weather Ometer have shown that in order to achieve improved UV resistance for a three-layer film it is fully sufficient for the outer layers of thickness of from 0.5 to 2 μm to be provided with UV stabilizers. Fire tests to DIN 4102 Part 1 and Part 2, and also the UL 94 test have equally surprisingly shown that compliance of the film of the invention with the requirements extends to the range of thickness from 5 to 300 μm.

The flame-retardant, UV-resistant, thermoformable, multilayer films produced using known coextrusion technology are therefore of great economic interest when compared with monofilms provided with UV stabilizers and flame retardants throughout, since markedly less additives are needed for comparable flame retardancy and UV resistance.

At least one side of the film may also have been provided with a scratch-resistant coating, with a copolyester, or with an adhesion promoter.

Weathering tests have shown that even after from 5 to 7 years of outdoor use (extrapolated from the weathering tests) the flame-retardant UV-resistant films of the invention generally exhibit no increased yellowing, no embrittlement, no loss of surface gloss, no surface cracking, and no impairment of mechanical properties.

The results of measurements indicate that the film of the invention or the molding does not embrittle when exposed to heat at 100° C. over a prolonged period. This result is attributable to the synergistic action of appropriate precrystallization, predrying, masterbatch technology, and modification with UV stabilizer.

The film can be thermoformed without predrying, and can therefore be used to produce complex moldings.

The thermoforming process generally encompasses the steps of predrying, heating, molding, cooling, demolding, and heat-conditioning. Surprisingly, during the thermoforming process it was found that the films of the invention can be thermoformed without prior predrying. This advantage over thermoformable polycarbonate films or thermoformable polymethacrylate films, which require predrying times of from 10 to 15 hours, at temperatures of from 100 to 120° C., depending on thickness, drastically reduces the costs of the forming process.

The following process parameters for the thermoforming process were found:

| Step of process | Film of invention |
| --- | --- |
| Predrying | not required |
| Temperature of mold °C. | from 100 to 160 |
| Heating time | <5 sec per 10 μm of film thickness |
| Film temperature during thermoforming °C. | from 160 to 220 |
| Possible orientation factor | from 1.5 to 2.0 |
| Reproduction of detail | good |
| Shrinkage (%) | <1.5 |

The film of the invention or the molding produced therefrom can moreover be recycled without difficulty and without pollution of the environment, and without loss of mechanical properties, and is therefore suitable for use as short-lived advertising placards, for example, for the construction of exhibition stands, or for other promotional items where fire protection and thermoformability is desired.

An example of a method for producing the white, flame-retardant, thermoformable, UV-resistant film of the invention is the extrusion process on an extrusion line.

According to the invention, the flame retardant is added by way of masterbatch technology. The flame retardant is fully dispersed in a carrier material. Carrier materials which may be used are the thermoplastic itself, e.g. the polyethylene terephthalate, or else other polymers compatible with the thermoplastic.

According to the invention, the UV stabilizer and the white pigment may be fed before the material leaves the producer of the thermoplastic polymer, or during the production of the film, into the extruder.

DEG content and/or PEG content of the polyethylene terephthalate are set at the premises of the polymer producer during the polycondensation process.

Addition of the white pigment and of the UV stabilizer by way of masterbatch technology is particularly preferred. The UV stabilizer and, respectively, the white pigment is fully dispersed in a solid carrier material. Carrier materials which may be used are the thermoplastic itself, e.g. the polyethylene terephthalate, or else other polymers sufficiently compatible with the thermoplastic.

It is important in masterbatch technology that the grain size and the bulk density of the masterbatch are similar to the grain size and the bulk density of the thermoplastic, thus permitting uniform distribution and, with this, uniform UV resistance.

The polyester films may be produced by known processes from a polyester, where appropriate with other polymers, with the flame retardant, with the white pigment, with the UV absorber, and/or with other conventional additives in conventional amounts from 1.0 to not more than 30% by weight, either in the form of a monofilm or else in the form of multilayer, where appropriate coextruded films with surfaces of identical or different nature, for example pigment being present in one surface but no pigment being present in the other surface. It is also possible for one or both surfaces of the film to be provided with a conventional functional coating by known processes.

It is important for the invention that the masterbatch which comprises the flame retardant and, where appropriate, the hydrolysis stabilizer, is precrystallized or predried. This predrying includes progressive heating of the masterbatch at subatmospheric pressure (from 20 to 80 mbar, preferably from 30 to 60 mbar, in particular from 40 to 50 mbar), with stirring, and, where appropriate, post-drying at a constant elevated temperature, again at subatmospheric pressure. The masterbatch is preferably charged at room temperature from a feed vessel in the desired blend with the polymers of the base and/or outer layers and, where appropriate, with other raw material components, batchwise in a vacuum dryer which during the course of the drying time or residence time traverses a temperature profile from 10 to 160° C., preferably from 20 to 150° C., in particular from 30 to 130° C. During the residence time of about 6 hours, preferably 5 hours, in particular 4 hours, the raw material mixture is stirred at from 10 to 70 rpm, preferably from 15 to 65 rpm, in particular from 20 to 60 rpm. The resultant precrystallized or predried raw material mixture is post-dried for from 2 to 8 hours, preferably from 3 to 7 hours, in particular from 4 to 6 hours, in a downstream vessel, likewise evacuated, at from 90 to 180° C., preferably from 100 to 170° C., in particular from 110 to 160° C.

In the preferred extrusion process for producing the polyester film, the molten polyester material is extruded through a slot die and, in the form of a substantially amorphous prefilm, quenched on a chill roll. This film is then reheated and stretched longitudinally and transversely, or transversely and longitudinally, or longitudinally, transversely, and again and longitudinally and/or transversely. The stretching temperatures are generally from $T_G+10°$ C. to $T_G+60°$ C. ($T_G$=glass transition temperature), and the stretching ratio for longitudinal stretching is usually from 2 to 6, in particular from 3 to 4.5, and that for transverse stretching is from 2 to 5, in particular from 3 to 4.5, and that for any second longitudinal or transverse stretching carried out is from 1.1 to 5. The first longitudinal stretching may, where appropriate, take place simultaneously with transverse stretching (simultaneous stretching). Heat-setting of the film then follows with oven temperatures of from 180 to 260° C., in particular from 220 to 250° C. The film is then cooled and wound.

The surprising combination of exceptional properties gives the film of the invention excellent suitability for a wide variety of applications, for example for interior decoration, for exhibition stands or exhibition requisites, as displays, for placards, for protective glazing of machinery or of vehicles, in the lighting sector, in the fitting-out of shops or of stores, as a promotional item or laminating medium, for greenhouses, for roofing systems, external cladding, protective coverings, applications in the construction sector, and illuminated advertising profiles, blinds, or electrical applications.

Its thermoformability makes the film of the invention suitable for thermoforming desired moldings for indoor or outdoor applications.

The invention is further illustrated below using examples.

The following standards or methods are used here in measuring the individual properties.

TEST METHODS

DEG Content, PEG Content and IPA Content

DEG, PEG, or IPA content is determined by gas chromatography after dissolving the thermoplastic polymer in cresol.

Surface Gloss

Surface gloss is measured at a measurement angle of 20° to DIN 67530.

Light Transmittance

Light transmittance is the ratio of the total transmitted light to the amount of incident light. Light transmittance is measured using the "®HAZEGARD plus" tester to ASTM D 1003.

Haze

Haze is that percentage proportion of transmitted light which deviates by more than 2.5° from the average direction of the incident light beam. Clarity is determined at an angle of less than 2.5°.

Haze is [lacuna] using the "HAZEGARD plus" tester to ASTM D 1003.

Surface Defects

Surface defects are determined visually.

Mechanical Properties

Modulus of elasticity and tensile stress at break, and tensile strain at break, are measured longitudinally and transversely to ISO 527-1-2.

SV (DCA), IV (DVA)

Standard viscosity SV (DCA) is measured by a method based on DIN 53726 in dichloroacetic acid.

Intrinsic viscosity (IV) is calculated from standard viscosity as follows $$IV (DCA) = 6.67 \cdot 10^{-4} SV(DCA) + 0.118$$

Fire Performance

Fire performance is determined to DIN 4102 Part 2, construction materials class B2, and to DIN 4102 Part 1, construction materials class B1, and also to the UL 94 test.

Weathering (Bilateral), UV Resistance

UV resistance is tested as follows to the ISO 4892 test specification:

| Tester | Atlas Ci 65 Weather Ometer |
| --- | --- |
| Test conditions | Iso 4892, i.e. artificial weathering |
| Irradiation time | 1 000 hours (per side) |
| Irradiation | 0.5 W/m², 340 nm |
| Temperature | 63° C. |
| Relative humidity | 50% |
| Xenon lamp | internal and external filter made from borosilicate |
| Irradiation cycles | 102 minutes of UV light, then 18 minutes of UV light with water spray on the specimens, then again 102 minutes of UV light, etc. |

Yellowness Index (YI) is the deviation from the colorless condition in the "yellow" direction and is measured to DIN 6167. Yellowness indices (YIs) <5 are not visually detectable.

In each case, the examples and comparative examples below use white films of varying thickness, produced on the extrusion line described.

All of the films were weathered bilaterally to ISO 4892 test specification, in each case for 1000 hours per side using the Atlas Ci 65 Weather Ometer from the company Atlas, and then tested for mechanical properties, Yellowness Index (YI), surface defects, light transmission, and gloss.

Fire tests to DIN 4102, Part 2 and Part 1, and the UL 94 test, were carried out on all of the films.

EXAMPLES

Example 1

A white film of 50 m thickness is produced and comprises, as principal constituent, polyethylene terephthalate, 7.0% by weight of titanium dioxide, and 1.0% by weight of the UV stabilizer 2-(4,6-diphenyl-1,3,5-triazin-2-yl)-5-(hexyl)oxyphenol (®Tinuvin 1577 from the company Ciba-Geigy) and 2.0% by weight of flame retardant.

The titanium dioxide is of rutile type and has an average particle diameter of 0.20 µm, and has a coating of $Al_2O_3$. ®Tinuvin 1577 has a melting point of 149° C. and is thermally stable up to about 330° C.

For purposes of uniform distribution, the titanium dioxide and the UV absorber is incorporated into the PET directly at the premises of the polymer producer.

The flame retardant is the PET soluble organophosphorus compound Amgard P1045 from the company Albright & Wilson.

The flame retardant is fed in the form of a masterbatch. The masterbatch is composed of 10% by weight of flame retardant and 80% by weight of PET, and its bulk density is 750 kg/m³.

The PET from which the film is produced and the PET that is utilized for masterbatch production have standard viscosity SV (DCA) of 810, corresponding to intrinsic viscosity IV (DCA) of 0.658 dl/g. DEG content and PEG content are 1.6% by weight. 50% of the polyethylene terephthalate, 30% by weight of recycled polyethylene terephthalate material, and 20% by weight of the masterbatch are charged at room temperature from separate feed vessels in a vacuum dryer which from the juncture of charging to the end of the residence time traverses a temperature profile from 25 to 130° C. During the residence time of about 4 hours, the raw material mixture is stirred at 61 rpm.

The precrystallized or predried raw material mixture is post-dried in the downstream hopper, likewise under vacuum, at 140° C. for 4 hours. The 50 µm monofilm is then produced using the extrusion process described.

The individual steps of the process were:

| | | |
|---|---|---|
| Longitudinal stretching | Temperature: | 85–135° C. |
| | Longitudinal stretching ratio: | 4.0:1 |
| Transverse stretching | Temperature: | 85–135° C. |
| | Transverse stretching ratio: | 4.0:1 |
| Setting | Temperature: | 230° C. |

The white PET film produced had the following property profile:

| | |
|---|---|
| Thickness | 50 μm |
| Surface gloss side 1 | 72 |
| (Measurement angle 20°) side 2 | 68 |
| Light transmittance | 28% |
| Surface defects per m$^2$ | none |
| Longitudinal modulus of elasticity | 3 700 N/mm$^2$ |
| Transverse modulus of elasticity | 4 800 N/mm$^2$ |
| Longitudinal tensile stress at break | 130 N/mm$^2$ |
| Transverse tensile stress at break | 205 N/mm$^2$ |
| Yellowness Index (YI) | 48 |
| Coloration | uniform |

The film fulfills the requirements of construction materials classes B2 and B1 to DIN 4102 Part 2 and Part 1. The film passes the UL 94 test.

After 200 hours of heat-conditioning at 100° C. in a circulating-air drying cabinet the mechanical properties are unaltered. The film exhibits no embrittlement phenomena of any kind.

After in each case 1000 hours of weathering per side with the Atlas CI 65 Weather Ometer the PET film has the following properties:

| | |
|---|---|
| Thickness | 50 μm |
| Surface gloss side 1 | 65 |
| (Measurement angle 20°) side 2 | 60 |
| Light transmittance | 35% |
| Surface defects per m$^2$ | none |
| Longitudinal modulus of elasticity | 3 550 N/mm$^2$ |
| Transverse modulus of elasticity | 4 650 N/mm$^2$ |
| Longitudinal tensile stress at break | 118 N/mm$^2$ |
| Transverse tensile stress at break | 190 N/mm$^2$ |
| Yellowness Index (YI) | 49 |

Example 2

Coextrusion technology is used to produce a multilayer PET film of thickness 17 μm with the layer sequence A-B-A, B being the core layer and A being the outer layers. The thickness of the core layer is 15 μm and that of each of the two outer layers which cover the core layer is 1 μm.

The polyethylene terephthalate used for the core layer B is identical with that of example 1 except that it comprises no UV absorber.

The core layer moreover comprises 2% by weight of flame retardant, the flame retardant being fed in the form of a masterbatch. The masterbatch is composed of 10% by weight of flame retardant and 90% by weight of PET.

The PET of the outer layers has a standard viscosity SV (DCA) of 810 and has been provided with 1% by weight of Tinuvin 1577 and 0.3% by weight of Sylobloc. The outer layers comprise no titanium dioxide and no flame retardant.

For the core layer, 50% by weight of polyethylene terephthalate, 30% by weight of recycled polyethylene terephthalate material, and 20% by weight of the masterbatch are precrystallized, predried, and post-dried as in example 1.

The outer layer polymer does not undergo any particular drying. Coextrusion technology is used to produce a film of thickness 17 μm with the layer sequence A-B-A and with the following properties:

| | |
|---|---|
| Layer structure | A-B-A |
| Total thickness | 17 μm |
| Surface gloss side 1 | 131 |
| (Measurement angle 20°) side 2 | 126 |
| Light transmittance | 49% |
| Surface defects (specks, orange peel, bubbles, . . . ) | none |
| Longitudinal modulus of elasticity | 3 550 N/mm$^2$ |
| Transverse modulus of elasticity | 4 130 N/mm$^2$ |
| Longitudinal tensile stress at break | 120 N/mm$^2$ |
| Transverse tensile stress at break | 155 N/mm$^2$ |
| Yellowness Index (YI) | 13.3 |
| Coloration | uniform |

After 200 hours of heat-conditioning at 100° C. in a circulating-air drying cabinet the mechanical properties are unaltered. The film exhibits no embrittlement phenomena of any kind.

The film fulfills the requirements of construction materials class B2 and B1 to DIN 4102 Part 2 and Part 1. The film passes the UL 94 test.

After in each case 1000 hours of weathering per side with the Atlas CI 65 Weather Ometer the PET film has the following properties:

| | |
|---|---|
| Layer structure | A-B-A |
| Total thickness | 17 μm |
| Surface gloss side 1 | 125 |
| (Measurement angle 20°) side 2 | 116 |
| Light transmittance | 45% |
| Surface defects (specks, orange peel, bubbles, . . . ) | none |
| Longitudinal modulus of elasticity | 3 460 N/mm$^2$ |
| Transverse modulus of elasticity | 4 050 N/mm$^2$ |
| Longitudinal tensile stress at break | 110 N/mm$^2$ |
| Transverse tensile stress at break | 145 N/mm$^2$ |
| Yellowness Index (YI) | 15.1 |
| Coloration | uniform |

Example 3

A 20 μm A-B-A film is produced as in example 2, the thickness of the core layer B being 16 μm and that of each of the outer layers A being 2 μm.

The core layer B comprises only 5% by weight of the flame retardant masterbatch of example 2.

The outer layers are identical with those of example 2, except that they comprise 20% by weight of the flame retardant masterbatch used in example 2 only for the core layer.

The raw materials and the masterbatch for the core layer and the outer layers are precrystallized, predried, and post-dried as in example 1.

The multilayer 20 μm film produced by means of coextrusion technology has the following property profile:

| | |
|---|---|
| Layer structure | A-B-A |
| Total thickness | 20 μm |
| Surface gloss side 1 | 136 |
| (Measurement angle 20°) side 2 | 128 |
| Light transmittance | 41% |
| Surface defects (specks, orange peel, bubbles, . . . ) | none |
| Longitudinal modulus of elasticity | 3 400 N/mm² |
| Transverse modulus of elasticity | 4 100 N/mm² |
| Longitudinal tensile stress at break | 120 N/mm² |
| Transverse tensile stress at break | 160 N/mm² |
| Yellowness Index (YI) | 13.1 |

After 200 hours of heat-conditioning at 100° C. in a circulating-air drying cabinet the mechanical properties are unaltered. The film exhibits no embrittlement phenomena of any kind.

The film fulfills the requirements of construction materials classes B2 and B1 to DIN 4102 Part 2 and Part 1. The film passes the UL 94 test.

After in each case 1000 hours of weathering per side with the Atlas CI 65 Weather Ometer the PET film has the following properties:

| | |
|---|---|
| Layer structure | A-B-A |
| Total thickness | 20 μm |
| Surface gloss side 1 | 124 |
| (Measurement angle 20°) side 2 | 117 |
| Light transmittance | 38% |
| Surface defects (specks, orange peel, bubbles, . . . ) | none |
| Longitudinal modulus of elasticity | 3 350 N/mm² |
| Transverse modulus of elasticity | 4 000 N/mm² |
| Longitudinal tensile stress at break | 105 N/mm² |
| Transverse tensile stress at break | 140 N/mm² |
| Yellowness Index (YI) | 15.8 |

Thermoformability

The films of examples 1 to 3 can be thermoformed on commercially available thermoforming machinery, e.g. from the company Illig, to give moldings, without predrying. The reproduction of detail in the moldings is excellent, with uniform surface.

Comparative example 1

Example 2 is repeated. However, the film is not provided with UV absorbers, nor with flame retardant masterbatch. DEG content is the commercially available 0.7%, and no PEG is present.

The white film produced has the following property profile:

| | |
|---|---|
| Layer structure | A-B-A |
| Total thickness | 17 μm |
| Surface gloss side 1 | 139 |
| (Measurement angle 20°) side 2 | 130 |
| Light transmittance | 50% |
| Surface defects (specks, orange peel, bubbles, . . . ) | none |
| Longitudinal modulus of elasticity | 4 250 N/mm² |
| Transverse modulus of elasticity | 4 700 N/mm² |
| Longitudinal tensile stress at break | 180 N/mm² |
| Transverse tensile stress at break | 215 N/mm² |

-continued

| | |
|---|---|
| Yellowness Index (YI) | 12.0 |
| Coloration | uniform |

The unmodified film does not fulfill the requirements of the tests to DIN 4102 Part 1 and Part 2, or of the UL 94 test.

The film has inadequate thermoformability.

After 1000 hours of weathering per side using the Atlas CI Weather Ometer the film exhibits embrittlement phenomena and cracking on the surfaces. This makes it impossible to measure the property profile precisely—in particular the mechanical properties. Furthermore, the film has visible yellow coloration.

What is claimed is:

1. A white, thermoformable film with a thickness in the range from 1 to 350 μm, which comprises a crystallizable thermoplastic principal constituent, said thermoplastic having a DEG content of ≧1.0% by weight and/or a PEG content of ≧1.0% by weight, and comprises at least one white pigment, said pigment being 0.5–25% by weight TiO₂ particles with a diameter from 0.10 to 0.50 μm or 1.0–25% by weight barium sulfate with a diameter from 0.20 to 1.20 μm, at least one UV stabilizer, said stabilizer being 0.01–5.0% by weight of 2-hydroxybenzotriazoles or triazines, and at least one flame retardant which flame retardant is soluble in the thermoplastic, said flame retardant being 1–20% by weight of dimethyl methyl phosphonate, and is fed directly during the production of the film by way of masterbatch technology, wherein the masterbatch has been pretreated by gradual heating at subatmospheric pressure, with stirring.

2. The film as claimed in claim 1, wherein the gradual heating at subatmospheric pressure, with stirring, is directly followed by post-drying at a constant, elevated temperature, again at subatmospheric pressure.

3. The film as claimed in claim 1, wherein the UV stabilizer is selected from one or more of 2(4,6-diphenyl-1, 3,5-triazin-2-yl)-5-(hexyl)oxyphenol and 2,2'-methylenebis (6-(2H-benzotriazol-2-yl)-4-(1,1,3,3-tetramethyl-butyl) phenol.

4. The film as claimed in claim 1, wherein the white pigment has a coating.

5. The film as claimed in claim 1, wherein the average particle size of the TiO₂ is from 0.10–0.30 μm.

6. The film as claimed in claim 1, wherein the surface gloss measured to DIN 67530 (measurement angle 20°) is greater than 15.

7. The film as claimed in claim 1, wherein the light transmittance measured to ASTM D 1003 is smaller than 70%.

8. The film as claimed in claim 1, wherein the modulus of elasticity measured to ISO 527-1-2 is greater than 3200 N/mm² longitudinally and greater than 3500 N/mm² transversely.

9. The film as claimed in claim 1, wherein the crystallizable thermoplastic is selected from polyethylene terephthalate, polybutylene terephthalate, polyethylene naphthalate, and mixtures of one or more of these thermoplastics.

10. The film as claimed in claim 9, wherein polyethylene terephthalate is used as crystallizable thermoplastic.

11. The film as claimed in claim 10, which comprises recycled material.

12. The film as claimed in claim 1, which has a single-layer structure.

13. The film as claimed in claim 1, which has a multilayer structure with at least one outer layer and with at least one core layer.

14. The film as claimed in claim 13, wherein the multilayer structure has two outer layers and a core layer located between the outer layers.

15. The film as claimed in claim 13 or 14, wherein at least one UV stabilizer is present in the outer layer or layers.

16. The film as claimed in claim 13 or 14, wherein at least one white pigment is present in the base layer.

17. The film as claimed in claim 13 or 14, wherein at least one flame retardant is present in the base layer.

18. A process for producing a thermoplastic film as claimed in claim 1, in which a crystallizable thermoplastic is melted in at least one extruder, and the resultant polymer melt corresponding to the composition of the film layer, or the resultant polymer welts corresponding to the compositions of the outer and base layers, are fed to a die or, respectively, to a coextrusion die, and are extruded from the die onto a chill roll, and the resultant prefilm is then biaxially oriented and heat-set, where the polymer melt for the base layer or for the outer layer or layers or for the base layer and the outer layer or layers comprise one or more of a flame retardant a white pigment, and the polymer melt for the outer layer or layers comprise at least one UV stabilizer.

19. The process as claimed in claim 18, wherein the addition of one or more of the flame retardant, the UV stabilizer and the white pigment takes place by way of masterbatch technology.

20. The method of making an interior decoration, a display, a placard, a protective glazing, a shop outfit, a promotional item, a laminating medium, a roofing system, an external cladding, a protective covering, or an illuminated advertising profile or blind which comprise converting a film as claimed in claim 1 into an interior decoration, a display, a placard, a protective glazing, a shop outfit, a promotional item, a laminating medium, a rooting system, an external cladding, a protective covering, or an illuminated advertising profile or blind.

\* \* \* \* \*